United States Patent
Mitchell

[11] 3,888,345
[45] June 10, 1975

[54] CONVEYOR BELT CLEANER

[76] Inventor: Laymon Mitchell, 307 Poinciana Dr., Homewood, Ala. 35209

[22] Filed: Nov. 26, 1973

[21] Appl. No.: 418,931

Related U.S. Application Data

[63] Continuation-in-part of Ser. No. 316,344, Dec. 18, 1972, abandoned.

[52] U.S. Cl. ............................... 198/230; 74/230
[51] Int. Cl. ............................................ B65g 45/00
[58] Field of Search ...................... 198/230; 74/230

[56] References Cited
UNITED STATES PATENTS

| | | | |
|---|---|---|---|
| 743,955 | 11/1903 | Thompson | 198/230 |
| 1,710,953 | 4/1929 | Sullivan | 198/230 |
| 1,776,419 | 9/1930 | Dodge | 198/230 X |
| 1,832,374 | 11/1931 | Forby et al. | 198/230 X |
| 2,109,123 | 2/1938 | White et al. | 198/230 X |
| 2,393,724 | 1/1946 | Vickers | 198/230 |
| 2,860,354 | 11/1958 | van Clief, Jr. | 198/230 |
| 3,161,285 | 12/1964 | Hummer et al. | 198/230 |
| 3,342,312 | 9/1967 | Reiter | 198/230 |
| 3,583,555 | 6/1971 | Karsnak | 198/230 |

FOREIGN PATENTS OR APPLICATIONS

| | | | |
|---|---|---|---|
| 655,213 | 7/1951 | United Kingdom | 198/230 |

*Primary Examiner*—Evon C. Blunk
*Assistant Examiner*—Richard K. Thompson

[57] ABSTRACT

An endless conveyor belt cleaner in which a helical cleaning roller rotates in contact with a belt in the same direction as movement of the belt and at a peripheral speed in excess of the speed of movement of the belt.

3 Claims, 1 Drawing Figure

PATENTED JUN 10 1975 3,889,345
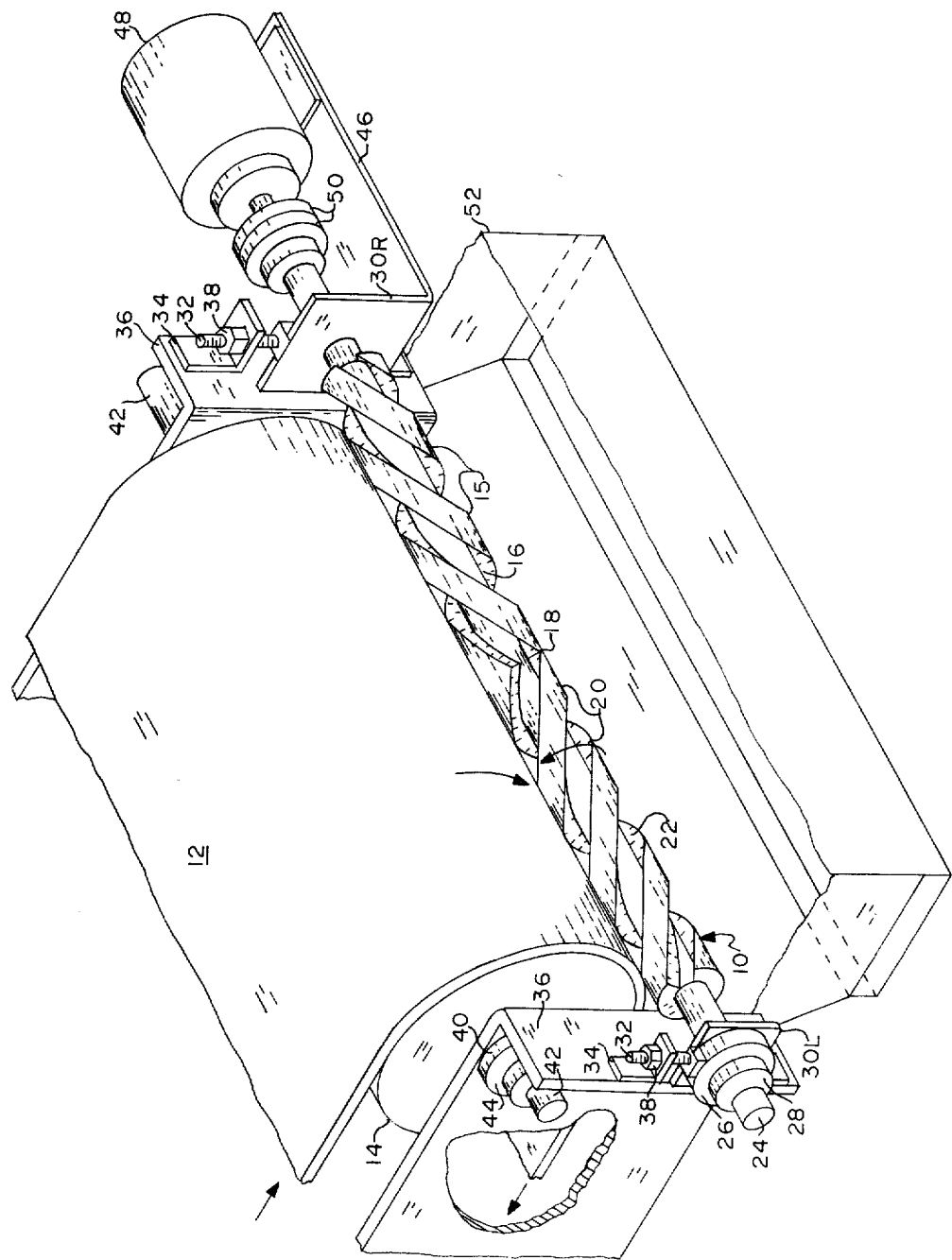

CONVEYOR BELT CLEANER

PRIOR APPLICATION

This application is a continuation-in-part of an application filed on Dec. 18, 1972 and assigned Ser. No. 316,344 now abandoned.

BACKGROUND OF THE INVENTION

1. Field of the Invention

This invention relates to devices and systems for the cleaning of conveyor belts and particularly to a system of a type incorporating a rotating cleaning member.

2. General Description of the Prior Art

In the past, conveyor belts have been cleaned almost exclusively by stationary rubber or metal blades or rotating brushes placed against a belt. Such belt cleaners have been and are still widely used as belt wear and belt capacity are adversely effected at a substantial rate when belts are not effectively cleaned. Further, the build-up of material on a belt not effectively cleaned will often be knocked loose and deposited in undesirable locations or allowed to generally permeate the environment, both in the air and on other equipment and environmental structures, which is, of course, undesirable. A further difficulty is that of wear and loss of effectiveness with wear of existing type belt cleaners. For example, one popular type, a counter weighted double-bladed rubber cleaner, simply wears out in a short time and material becomes packed between the blades. Another popular type employs steel blades and it has been found that these blades wear out almost as fast as rubber blades and also, in some instances, they cut the belts. A third popular type employs rotating brushes, rotating counter to the direction of movement of a belt, and these tend to produce a sanding effect on a belt causing short life.

Other known types of belt cleaners being presently marketed include spring types and plow types, but it is not seen wherein these overcome basic problems outlined above.

It has also heretofore been proposed that a belt cleaner be constructed in the form of a helically surfaced roller, either of rigid construction or of flexible construction. These proposals advocate cleaning of a belt by rotating the roller which opposes movement of the belt. In one form, the roller is simply rotated in a direction to provide a peripheral travel against a belt opposite to the direction of movement of the belt. In another form, the roller is rotated to produce a peripheral direction of movement along the same direction of movement of the belt, but peripheral speed of the roller is less than speed of the belt to thus produce an effective rubbing of the belt in a direction opposite to the movement of the belt. Such relative movement would appear desirable inasmuch as cleaning effect would appear to be obtained by such rubbing. These proposals are in accord with the various types of stationary cleaners referred to above wherein the relative force between the cleaner and the belt is in a direction opposite to the direction of movement of the belt.

SUMMARY OF THE INVENTION

The applicant has made what he believes to be the significant discovery that, contrary to the principle and operation of the prior art devices and proposals, the belt cleaner should not provide an engagement and frictional force to the belt of a direction opposite to the direction of movement of the belt, that such force tends to further embed particles into the surface of the belt to produce both wear and build-up on the belt and abrasive force back on the cleaner with the result that both are adversely effected requiring premature replacement of either or of both the cleaner and belt. The applicant has determined instead that the cleaner be a helically surfaced roller but that it be rotated with a relative rubbing force along the direction of movement of the belt. That is, a helically surfaced roller would be rotated in a peripheral direction of movement corresponding to the movement of the belt with a peripheral speed in excess of the speed of movement of the belt.

BRIEF DESCRIPTION OF THE DRAWING

The single drawing is a perspective view illustrating the structure and operation of an embodiment of the invention.

DETAILED DESCRIPTION OF THE DRAWING

Referring to the drawing, cleaning roller 10 is constructed of steel, fiberglass, or other suitable material, the material depending upon the composition of material to be conveyed by belt 12, shown rotably supported by pulley 14. A left-hand helical formation 15 and groove 16 are formed to the right of center 18 of roller 10, and a right-hand helical formation 20 and groove 22 are formed to the left of center 18. The helical formations are formed on shaft 24 supported at either end by bearings 26 and collars 28. Each bearing 26 (only left one shown) is mounted on a plate (left plate labelled 30L and right plate labelled 30R) which is in turn attached to bolt 32. Bolt 32 passes through an opening (not shown) in L-shaped bracket 34 mounted (by means not shown) on pulley support 36. By adjustment of nut 38, roller 10 may be adjusted in proximity and rubbing engagement with belt 12. Bearings 40 support pulley shaft 42 on pulley supports 36, shaft 42 being positioned by collars 44. Motor support 46 extends from mounting plate 30R attached to the right-hand bearing behind plate 30R and supports drive motor 48. Motor 48 is coupled by conventional shaft couplers 50 to shaft 24 to drive roller 10 in the indicated direction. Thus, as shown, the peripheral movement of roller 10 is in the same direction as belt 12. Flow of material from belt 12 is down through hopper 52.

The overall diameter of roller 10 would be in the range of 3 to 5 inches and the depth of grooves 16 would range from ¼ inch at the smaller rotor diameter to ½ inch at the larger rotor diameter. The width of the grooves would vary in the same proportion from 1 inch at the smaller depth to 1½ inches wide at the larger depth. The width of the spiral formations or lands 15 and 20 would correspondingly vary from 1 to 1½ inches as a function of these same proportions. In order to provide a mating engagement with belt-covered pulley 14, which typically would be tapered to have a larger diameter in the center, roller 10 would be tapered and typically having a taper ranging from 0 to ⅛ inches in 12 inches, that is, a center 18 of roller 10 would typically be smaller in diameter than the outer ends of the roller.

The pitch of a helix would typically vary from 30° to 45°, measured from a line parallel to the axis of roller 10. The transverse circular pitch of the roller would vary from 1½ inches to 6 inches.

Belt speeds typically vary from 50 feet per minute to 750 feet per minute, and the corresponding peripheral speed of roller 10 would range from 100 feet per minute to 1,800 feet per minute, the ratio of roller speed to belt speed being in a range of 1½ to 2½ times. Of course, as indicated above, the direction of peripheral movement of roller 10 corresponds to the direction of movement of belt 12 as indicated by the arrows.

In addition to other features of the invention described above, the relatively high rotor speed enabled by moving the rotor in the same direction as the belt, roller 10 is effectively self-cleaned due to centrifugal action. Dribble from the belt is directed to the center of roller 10 by the reverse helix surface and simply follows the flow of material being conveyed by belt 12 down through discharge hopper 52. Thus, material is not significantly scattered from the bottom of belt 12 along the travel of the belt as will occur with ineffective cleaning.

In summary, the applicant has discovered and determined a new system for cleaning conveyor belts which is more effective, as it does not tend to push particles back into a belt; roller wear and belt wear are significantly reduced; and because of the more effective cleaning, particle build-up on the belt is significantly less and belt capacity is maintained.

What is claimed is:

1. In combination with a flexible belt entrained for movement about a pulley:
   a cleaning roller 3 to 5 inches in diameter rotatably mounted about a rotational axis substantially parallel to that of the pulley;
   means mounting said roller for rotation in peripheral contact with the belt and for adjustably positioning said roller with respect to said belt;
   drive means drivingly connected to said roller for imparting rotation thereto in a direction corresponding to the direction of movement of said belt and a roller speed of 1½ to 2½ times the speed of movement of said belt;
   said cleaning roller includes a plurality of circumferentially spaced continuous formations of a width of 1 to 1½ inches and projecting ¼ to ½ inch radially on said roller and forming helical grooves therebetween;
   the helix angle of said formation, measured perpendicular to the axis of said roller, is within the range of 30° to 45°; and
   the diameter of said roller increases from the center to each side of said roller at a rate of up to ⅛ inch in 12 inches.

2. A structure as defined in claim 1 wherein the pitch of said helical formation in regions on either side of the center of the said roller is reversed, whereby debris removed from said belt by said roller is moved to the center region of said roller and discharged therefrom.

3. A structure as defined in claim 2 wherein said belt speed varies from 50 feet per minute to 750 feet per minute and the peripheral speed of said roller varies directly with the speed of said belt from 100 feet per minute to 1,800 feet per minute.

* * * * *